Dec. 3, 1929. J. T. BOND 1,738,418
AIR DEFLECTOR
Filed Sept. 7, 1926
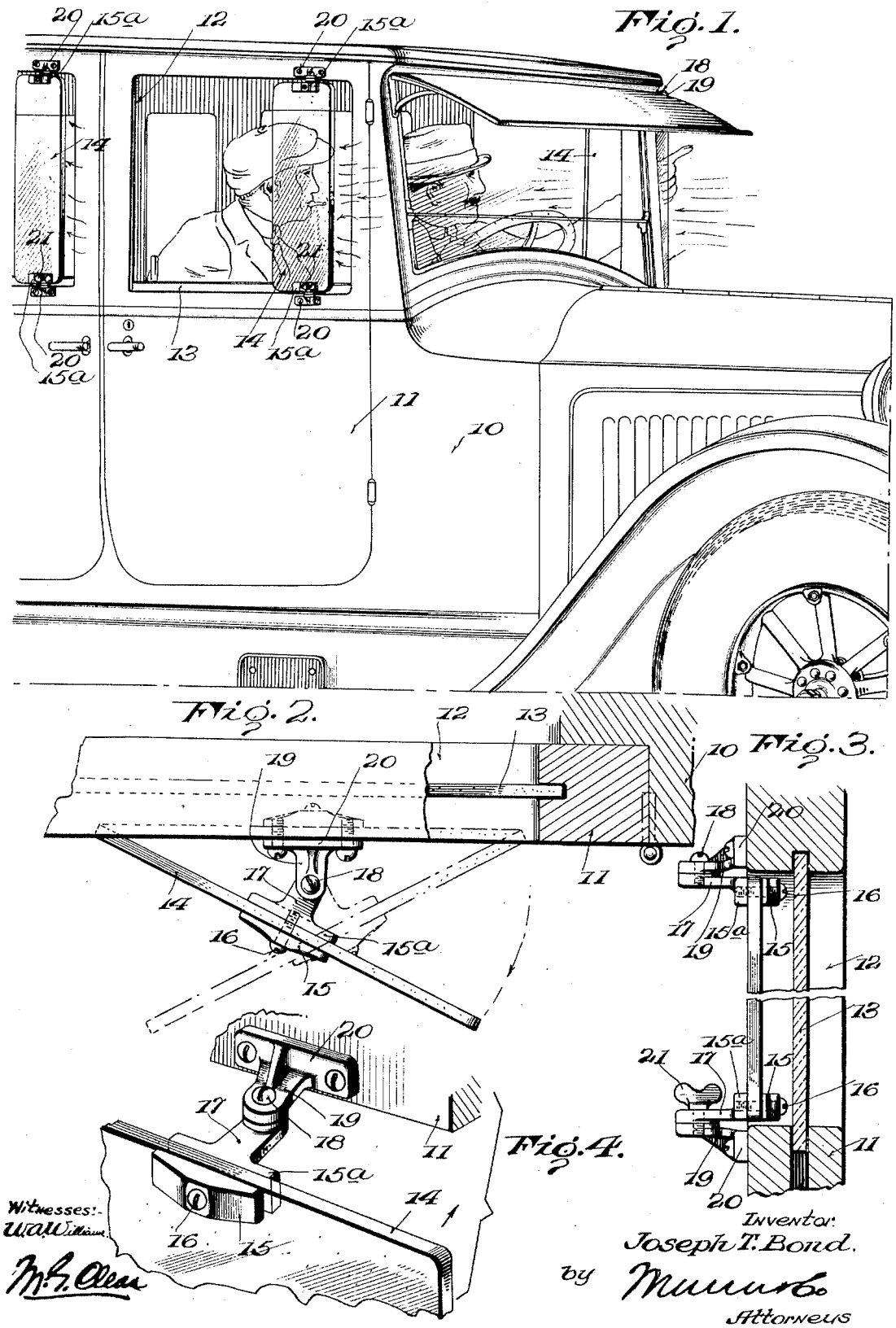
Inventor:
Joseph T. Bond.

Patented Dec. 3, 1929

1,738,418

UNITED STATES PATENT OFFICE

JOSEPH T. BOND, OF PHOENIX, NEW YORK

AIR DEFLECTOR

Application filed September 7, 1926. Serial No. 134,065. REISSUED

My present invention relates generally to air deflectors and more particularly to a device of this character adapted for use in connection with the window openings of automobile doors as utilized in closed automobile bodies, the primary object of the invention being the provision of an air deflector adapted to assume various angular positions in order to deflect air, rain, snow and the like away from the window openings as well as to deflect air into the window openings, and also adapted for movement to assume an inactive or closed position in which the deflector is wholly within the plane of the outer surface of an automobile door so that it will be protected and prevented from ready breakage.

In the accompanying drawings which illustrate my present invention and form a part of the specification:

Figure 1 is a perspective view illustrating the practical application of my invention, Figure 2 is a view partly in top plan and partly in horizontal section, showing my improved deflector in various positions in use, Figure 3 is a vertical sectional view showing my improved deflector in its inactive or closed position, and Figure 4 is a fragmentary perspective view illustrating one of the supporting connections of the deflector.

Referring now to these figures, and particularly to Fig. 1, I have shown an automobile of the closed body type generally indicated at 10, having a series of doors to each of which my improved deflector may be applied. One of these doors is indicated at 11, provided with an upper door opening 12 normally controlled by a vertically sliding transparent sash 13.

My improved deflector consists of a single transparent panel 14 of a length slightly less than the heighth of the window opening 12 and of a width which may be varied to suit the desires.

This panel is engaged at its upper and lower ends centrally between its side edges by clamping members 15 and 15ª against its opposite faces, connected by a single clamping screw or other element 16 passing through the central portion of the corresponding edge of the panel. One of these clamping members 15ª has an extension 17 connected by a vertically disposed pivot forming bolt, screw or the like 18, which movably joins the same with the outstanding extension 19 of a supporting bracket 20, the latter attached against the outer surface of the door above and below its window opening 12.

The brackets 20 are so disposed in practice in connection with the automobile door as to bring one edge of the deflector panel 14 closely adjacent to the forward vertical edge of the door adjoining its window opening 12, and it is obvious that upon the vertical pivot formed by the upper and lower supporting connection of the panel, the latter may be shifted to various angular relations to the door in the outstanding effective position of the deflector as will be seen by comparison of the full and dotted lines in Fig. 2. In this figure, the full lines indicate the deflector in position to deflect air into the body of the automobile with the sash 13 in lower or open position, while the dotted lines indicate the deflector in position to deflect air, rain or snow away from the body where this is desired.

In view of the fact, however, that the supporting brackets 20 are as shown in Fig. 3, respectively above and below the window opening and above and below the upper and lower pivot forming extensions of the panel clamps, the panel as a whole is free to swing through a movement of rotation of 180°, and when thus moved is reversed and brought to an inner inactive position parallel to the sash 13 as indicated in dotted lines in Fig. 2, and in full lines in Fig. 3, and by movement in the same direction to be swung into operative position. When in inactive position the entire panel is positioned within the plane of the outer surface of the door and will still permit of raising and lowering of the usual sash.

Thus it is obvious that my invention provides a deflector which may be easily manipulated and, since one of the pivot forming bolts, screws or other member has a winged or other type head, as indicated at 21, in Fig. 3, this pivot being preferably in connection with the lower hinge, forming members, the deflector as a whole, may be easily clamped in any desired position of adjustment.

It is also obvious that since the entire panel is transparent and supported simply by virtue of clamping members centrally of its extreme upper and lower edges, full vision through the deflector is provided for at all times.

Furthermore, the fact that the deflector panel may be shifted to inactive or closed position in which the panel lies in its entirety within the plane of the outer surface of the door in connection with which it is mounted, the danger of accidental fracture or breakage is reduced to a minimum, insuring a long effective life.

I may provide for greater effectiveness of the clamping members 15 and 15ª, by roughening or abrading the surfaces of the glass panel at the points where it is to be clamped and then employing thin pieces of cardboard and the like between these roughened surfaces and the clamping members.

I claim:

1. In combination with an automobile door having a window opening, an air deflector consisting of a transparent panel, and pivot supports between the door and the upper and lower edges of the panel, the pivots being offset from the outer face of the door and from the normal inner face of the panel, permitting rotation of the panel to reverse it and move it into and out of the door opening.

2. In combination with an automobile door having a window opening, an air deflector consisting of a transparent panel and pivot supports between the door and the upper and lower edges of the panel, the pivots being offset from the outer face of the door and from the normal inner face of the panel, permitting of swinging the panel into inclined position or rotation of the panel to move it into and out of the door opening, and including means for clamping the panel in various positions of adjustment with respect to the door opening.

JOSEPH T. BOND.